United States Patent [19]

Mathivat et al.

[11] Patent Number: 4,979,974

[45] Date of Patent: Dec. 25, 1990

[54] METHOD AND APPARATUS FOR POSITIONING OF A GLASS SHEET TRAVELLING ON A CONVEYOR

[75] Inventors: Denis Mathivat; Jean-Marc Petitcollin, both of Thourotte, France

[73] Assignee: Saint-Gobain Vitrage International, Courbevoie, France

[21] Appl. No.: 494,450

[22] Filed: Mar. 16, 1990

[30] Foreign Application Priority Data

Mar. 24, 1989 [FR] France .................. 89 03936

[51] Int. Cl.⁵ .......................................... C03B 23/023
[52] U.S. Cl. ......................................... 65/29; 65/106;
65/289; 65/291; 65/163
[58] Field of Search .................. 65/29, 163, 106, 289, 65/291

[56] References Cited

U.S. PATENT DOCUMENTS 4,634,329 1/1987 Diederen et al. ............. 65/106 X
4,666,493 5/1987 Frank et al. .................... 65/29
4,753,668 6/1988 Honjo et al. ................... 65/29
4,838,920 6/1989 Blasquez-Gonzoles et al. ..... 65/106 X

*Primary Examiner*—Robert L. Lindsay
*Attorney, Agent, or Firm*—Oblon, Spivak, McClelland, Maier & Neustadt

[57] ABSTRACT

For positioning a glass sheet moving on a conveyor, two substantially identical assemblies are positioned on opposite lateral sides of the conveyor. Each of the assemblies includes an arm carrying an abutment and extending in proximity to the conveyor such that a glass sheet moving on the conveyor will contact the abutment and be prevented from movement along the conveyor beyond the abutment. Contact between the glass sheet on the conveyor and an abutment will cause the abutment to move slightly, so that such contact can be detected. When the glass sheet contacts both abutments, the arms are driven for permitting passage of the glass sheet.

14 Claims, 1 Drawing Sheet

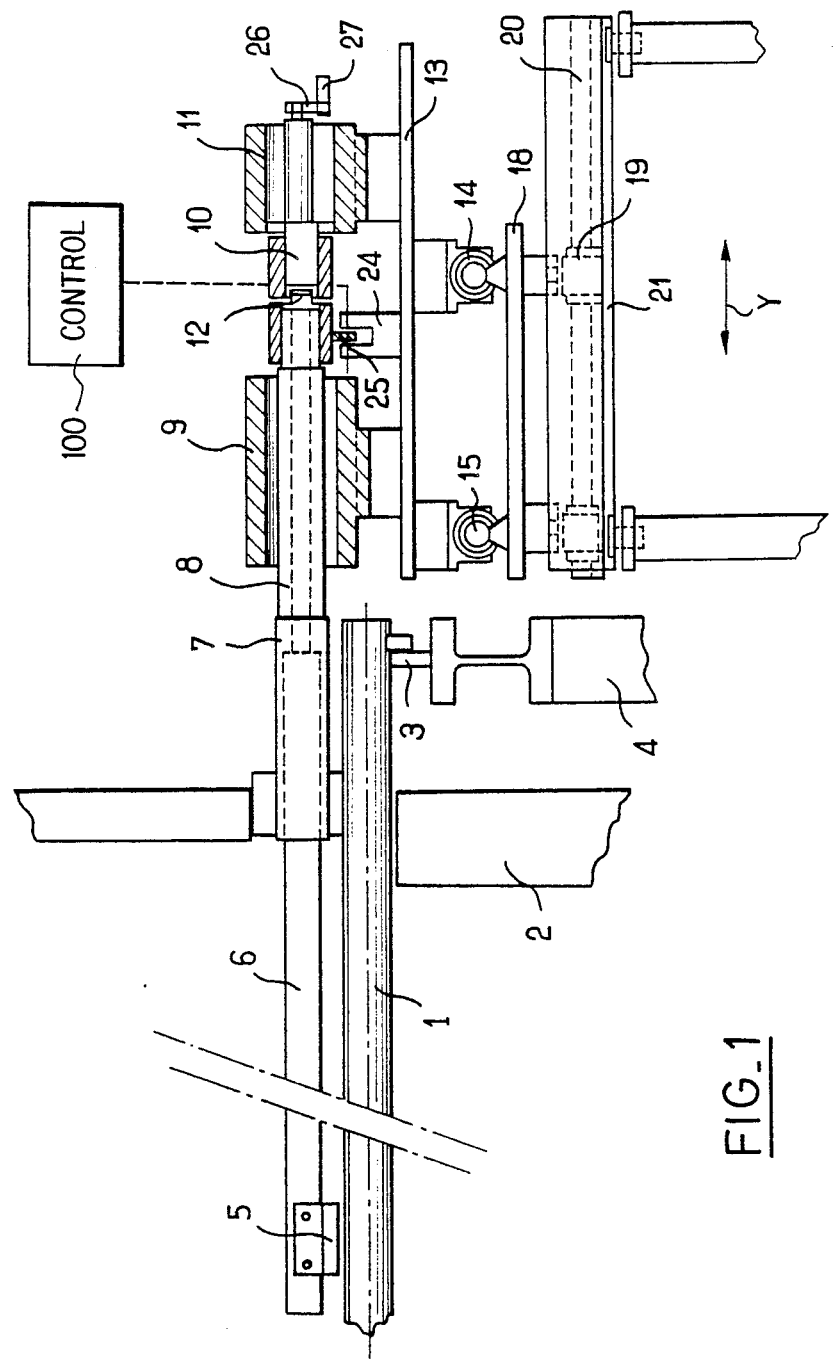
FIG_1

METHOD AND APPARATUS FOR POSITIONING OF A GLASS SHEET TRAVELLING ON A CONVEYOR

BACKGROUND OF THE INVENTION

1. Field of the Invention

The invention relates to the positioning of a glass sheet travelling on a conveyor, particularly a glass sheet heated to beyond its softening point with a view to its cambering and/or a heat treatment intended to modify certain of its mechanical characteristics. The invention more particularly relates to the production of glass plates or windows for motor vehicles.

2. Background of the Related Art

In order to supply a glass sheet which satisfies the important requirements of good conformity of camber and a satisfactory optical quality, it is important for the glass sheet to be correctly positioned prior to being taken up by the cambering and/or heat treatment tools. However, a glass sheet heated to beyond its softening point cannot be held by grippers or other gripping members, unless one is willing to accept the marks necessarily left behind by these members. Moreover, the positioning of the glass sheet relative to the tools prior to heating it, i.e., immobilizing these tools for an exceptionally long period, leads to very high production costs.

These problems of gripper marks and the stopping of the tools are significantly reduced with cambering and/or heat treatment processes in which the first stage, namely the heating of the glass sheet, takes place in a furnace traversed by the glass sheets, e.g., conveyed on a roller bed. However, the positioning problem is not solved because the travel speeds and the lengths of the furnaces are such that two successive glass sheets do not always have strictly identical trajectories. The trajectory variations can result in two types of defects, namely sliding perpendicular to the conveyor axis and rotation with respect to said axis and which are respectively obviated by lateral positioning means and frontal positioning means.

As stated in European Patent application No. EP-A-267 120, the lateral positioning may be obtained by means of guide bars which move together when advancing in the forward movement direction of the conveyor and which define a passage for the glass sheet. The glass rubs against the bars, but is not stopped by them.

However, as the glass sheets intended for motor vehicle windows are never in the form of rectangular plates, but almost always have a width varying from one end to the other of the plate, said lateral positioning is not adequate and must be completed by a frontal positioning which, according to EP-A-No. 267 120, involves a glass sheet shopping phase. In order to give the glass sheet the desired orientation, a stop member, e.g., one constituted by two abutments, is positioned along its path and is necessarily struck by one end of the leading edge of the sheet and maintained in place for an adequate time to enable the glass to be reoriented by the conveyor, which continues to move the glass sheet. For as long as the glass sheet is at least partly immobilized by the stop member, it rubs at the same point on the rollers, which can then leave behind an impression on the glass which is very easily marked due to its high temperature. Thus, frontal positioning is the source of numerous optical defects.

SUMMARY OF THE INVENTION

It is an object of the invention to provide a novel method and apparatus for the frontal positioning of a glass sheet which minimizes the friction of the glass on the rollers and consequently the marking risk.

The above, and other, objects are achieved according to the present invention by an apparatus for positioning a glass sheet moving on a conveyor, comprising two substantially identical assemblies positioned on opposite lateral sides of the conveyor. Each of the assemblies comprises an arm carrying an abutment and extending in proximity to said conveyor such that a glass sheet moving on the conveyor will contact the abutment and be prevented from movement along the conveyor beyond the abutment. Means are provided for moving the abutment such that the glass sheet can pass the abutment. Also provided are detector means for detecting contact between the abutment and the glass sheet moving on the conveyor and control means for controlling the means for moving. The control means comprise means for moving the abutment such that the glass sheet can pass only when the detector means of both of the two assemblies detect contact between a respective abutment and glass sheet moving on the conveyor.

According to a further feature of the invention, a process for positioning a glass sheet moving on a conveyor includes the steps of positioning two independently mounted abutments in proximity to the conveyor such that a glass sheet moving on the conveyor will contact the abutments and be prevented from movement beyond the abutments when the glass sheet is correctly positioned, detecting contact between the abutments and the glass sheet, and moving the abutment so as to permit passage of the glass sheet only when contact between the glass sheet and both of the abutments is detected.

The process according to the invention avoids any positioning time lag, the glass sheet only being held back for the real time necessary for its orientation, to which is only added the response time of the retraction mechanism, so that the friction time on the rollers is minimized for each glass sheet. Thus, this positioning process ensures a correct optical quality, even if there are considerable orientation variations between two successive sheets. Only the effective deviation of a position of a given sheet is taken into account and not the worst or greatest deviation observed.

In most cases, the random nature of the deviations observed means that one or another of the abutments can be struck first and each abutment is preferably equipped with means for detecting contact between the glass and the abutment.

Preferably, these detection means indirectly record the presence of one end of the glass sheet by measuring the momentum imparted to an abutment by the shock with the glass. Thus, a purely mechanical measurement is involved, which is advantageously completely independent of the temperature of the glass sheet. Moreover, this momentum can be transmitted without any delay by a lever arm up to a detection cell located outside the hot enclosure in which the conveyor is located.

The arm carrying an abutment is preferably connected by a dog coupling to a transmission shaft, whose rotation is controlled optionally via rod-handle system, by very fast devices of the electromagnet (solenoid)

type, or teleflexible ball-equipped mechanical controls. The dog must leave an adequate clearance between the shaft and the arm to enable the latter to respond to the thrust exerted by the glass sheet by a slight first displacement, which can e.g., be detected by means of a photoelectric cell. Advantageously, the control systems have response times of approximately 1/10 second.

Preferably, each positioning assembly is mounted on a carriage moving in accordance with two axes of the plane formed by the conveyor, namely a longitudinal axis parallel to the conveyor axis and an axis perpendicular to the former and in the plane of the conveyor, the displacement of the carriage making it possible to modify the position of the abutments, in order to take account of the different shapes and sizes of the glass sheets.

To the positioning apparatus is added a counter (e.g., in the control means), which defines the duration of the waiting phase during which the abutments are retracted, so as to permit the passage of the entire length of a glass sheet and to lower the abutments between two sheets travelling on the conveyor.

According to an improvement of the invention, throughout the positioning period, the two assemblies perform a translation movement along the longitudinal axis X, in the travel direction of the glass sheet and at a speed below the conveyor speed. For this purpose, the two carriages are displaced by means of one or two motors, e.g., motors positioned beneath the conveyor, and which simultaneously driven by them.

In this way, not only is the positioning time minimized (which is still slightly longer than previously due to the shifting of the abutments in front of the glass sheet), but also the intensity of the friction action, so that the hot glass sheet is now only decelerated and not stopped by one of the abutments.

Advantageously, the two assemblies are moved prior to the furthest forward end of the glass sheet striking against the first abutment, so that the abutments have already reached a constant travelling speed when the actual positioning starts. This movement is preferably initiated by the detection of the upstream arrival of a glass sheet, preferably by means of a light barrier, e.g., as known from EP-A-No. 267 850.

If it is decided to operate while maintaining the abutments mobile during positioning, the recording of the contact of the glass with the two abutments can be initially used for their simultaneous acceleration, instead of directly controlling their retraction, so that they rapidly move away from the glass sheet, and then the arms are pivoted to leave space for the sheet, which continues its travel. This obviates any risk of the glass sheet being raised slightly from the conveyor and sticking to the abutments, which occurs sometimes due to the high temperature of the glass sheet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a partial front view of a positioning assembly according to an embodiment of the invention; and FIG. 2 is a side view of the positioning assembly of FIG. 1.

DETAILED DESCRIPTION OF THE PREFERRED EMBODIMENT

FIGS. 1 and 2 disclose an embodiment of an apparatus for performing the invention. This positioning apparatus is mounted above a conveyor formed by a roller bed 1 which preferably constituted by hollow silica tubes, surrounded by a silica filament cloth and coated in the positioning zone with a product facilitating the sliding of the glass sheets, which can be of the lithopone or boron nitride type. These rollers 1 traverse a hot enclosure laterally defined by walls 2 and may rotate on rollers 3 positioned on a frame 4 located outside the hot enclosure.

The positioning of the glass sheets carried by the rollers 1 is obtained by an abutments 5 fixed to the ends of arms 6. An assembly with an abutment 5 on arm 6 mounted over the rollers 1 is illustrated, but it is also possible to operate with the arms beneath the rollers and projecting abutments so long as the abutments can be positioned so that a glass sheet on the rollers 3 will be prevented from moving beyond the abutment. The arm 6 may be formed by a metal tube. To its ends positioned outside the hot enclosure is fixed, by a sleeve 7, a drive rod 8 guided by a roller bearing 9. Following the drive rod 8 is positioned a shaft 10 guided in a roller bearing 11. The rod 8 and the shaft 10 are joined by a dog 12 with a small clearance between the gear teeth.

The roller bearings 9 and 11 are placed on a carriage 13, which can be translated on slides 15, parallel to the longitudinal axis X of the conveyor, along which slide the bearings 14. The displacement of the carriage is brought about by an endless screw or worm 16 driven by a handle 17 and which can only be seen in FIG. 2. The slides 15 and the worm 16 are supported by a table 18, which moves along an axis Y perpendicular to axis X, by means of bearings 19 integral with the table 18 and movable along slides 20 fixed to a bench 21 integral with the overall frame. The position of the table 18 is regulated by an endless screw 22 displaced by a handle 23.

It should be realized that another substantially identical assembly is positioned on the opposite lateral side of the conveyor 1, so that another arm 6 and abutment 5 extend into the path of the glass sheet on the conveyer 1.

The endless screws or worms 16 and 22 make it possible to very accurately regulate the position of the abutments both longitudinally and transversely, corresponding to the different shapes and sizes of the glass sheets.

A lug 25 fixed to the drive rod 8 is normally inserted in a gap of a sensor cell 24 mounted on table 18, such as an optical sensor, for detecting the normal rotational position of the arm 6.

As indicated hereinbefore, the arm 6 and its drive rod 8 are mounted in a roller bearing, preferably substantially without friction, so that a limited pressure exerted on the abutment 5 by the momentum of the glass sheet is sufficient to start the rotation of rod 8 and therefore the lug 25 by a first rotation, which first rotation uncovers the cell 24. This first rotation is by a very small angle insufficient to permit passage of a glass sheet and corresponds to the maximum play of the gear teeth of the dog 12.

Moreover, shaft 10 can be rotated to permit passage of the glass sheet by a handle 26 articulated to a rod 27 translated under the action of electromagnets (solenoids) 28. Control means 100 for the electromagnets 28 of both assemblies comprises a current supply circuit common to both assemblies. The supply circuit for these electromagnets on both sides of the conveyor has two switches in series, each switch being closed by one of the two cells, (i.e., that illustrated and another cell associated with the other, non-illustrated, apparatus) of the two positioning assemblies, so that the supply circuit is closed only when the two cells are uncovered, which means that the two abutments are in contact with the glass sheet.

The system operates in the following way. A first end of the leading edge of the glass sheet strikes an abutment 5, so that arm 6, the associated rod 8 and therefore lug 25 are rotated by the first rotation, due to the momentum of the glass sheets. One of the two cells 24 is thus no longer covered, which closes one of the switches. However, the abutment 5 otherwise remains in place and holds the glass sheet, which continues to be driven by the conveyor, so that after a certain time, dependent on the initial divergence of the glass sheet position, the second abutment is in turn struck, which brings about the closure of the corresponding switch. The supply circuit is then closed and the electromagnets displace rod 27 which, via handle 26, rotates the shaft 11 on both sides of the conveyor, e.g., by a half-turn. The complete response time of the system following the uncovering of the two cells is approximately 1/10 second.

The rotation of shafts 11 brings about the rotation of rods 8 coupled thereto by dogs 12 and therefore finally brings about the retraction of the abutments 5 to permit passage of the glass sheet.

In the case where the abutments are to be displaced parallel to the axis of the conveyor throughout the positioning time, the apparatus also has a motor which, by means of belts, simultaneously transmits its movement to worms or jacks associated with each of the benches 21.

In this case, the bench is moved at a speed V2, below the conveyor speed V1, and in the same direction as the latter, so that the glass sheet moved by the conveyor is able to catch up to the first abutment and then the second abutment, the contact of the glass with the second abutment, as hereinbefore, bringing about the simultaneous retraction of the two abutments. Preferably, the benches are brought back into the starting position at high speed with the abutments in the raised position for the positioning of the following glass sheet. Optionally, the benches may be accelerated to a velocity greater than V1 after the detection of the glass sheet by both abutments 5, but before rotation of the abutments by the electromagnets 28, to prevent sticking of the glass sheets on the abutments.

A positioning apparatus according to the invention can be used in any hot glass sheet treatment installation and in particular in cambering installations according to FR-A-Nos. 2 549 465, 2 604 992, 2 085 464, 2 567 508, 2 596 551 or 2 596 550.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Apparatus for positioning a glass sheet moving on a conveyor, comprising two substantially identical assemblies positioned on opposite lateral sides of the conveyor, each of said assemblies comprising:

an arm carrying an abutment and extending in proximity to the conveyor such that a glass sheet moving on the conveyor may contact said abutment and be prevented from movement along the conveyor beyond said abutment;

means for moving said abutment such that the glass sheet can pass the abutment;

detector means for detecting contact between said abutment and a glass sheet moving on the conveyor; and control means for controlling said means for moving said abutment such that the glass sheet can pass the abutment, wherein said control means comprise means for moving said abutment such that the glass sheet can pass the abutment only when said detector means of both of said two assemblies detect contact between a respective said abutment and the glass sheet moving on the conveyor.

2. The apparatus according to claim 1 wherein said control means is common to both of said assemblies and comprises a circuit supplying electric current to said means for moving said abutment such that the glass sheet can pass the abutment, said control means having two switches, each of said switches being connected to a respective detector means for closing in response to the respective detector means detecting contact between a respective said abutment and the glass sheet.

3. The apparatus according to claim 1 including means for moving each said assembly along two transverse directions in the plane of the conveyor.

4. The apparatus according to claim 1 wherein said arm is rotatably mounted such that contact between the glass sheet and said abutment causes a first rotation of said arm insufficient to permit passage of the glass sheet, and wherein said detector means comprises means for detecting said first rotation of said arm.

5. The apparatus according to claim 4 wherein said means for detecting the first rotation comprises a photoelectric cell normally covered by a lug of said arm and exposed by rotation of the lug with said arm during the first rotation of the arm.

6. The apparatus according to claim 4 wherein said means for moving said abutment such that the glass sheet can pass the abutment comprise:

a shaft coaxially coupled to said arm via a dog, said shaft having an eccentric handle; and a solenoid driven by said control means and connected to said handle for selectively operating said handle such that said arm rotates beyond said first rotation.

7. The apparatus according to claim 3 wherein one of said two transverse directions is the direction of movement of the glass sheet, whereby said abutment can move with said glass sheet.

8. The apparatus according to claim 1 including a sliding agent on said conveyor.

9. A process for positioning a glass sheet moving on a conveyor, comprising the steps of:

positioning two independently mounted abutments in proximity to the conveyor such that a glass sheet moving on the conveyor will contact said abutments and be prevented from moving beyond the abutments when the glass sheet is correctly positioned;

detecting contact between said abutments and the glass sheet; and moving said abutments so as to permit passage of the glass sheet only when contact between the glass sheet and both of said abutments is detected.

10. The process according to claim 9 including the step of moving said abutments in the direction of movement of the glass sheet and at a speed slower than that of the glass sheet, whereby the glass sheet can contact the moving abutments.

11. The process according to claim 10 wherein the movement of said abutments in the direction of movement of the glass sheet begins prior to the contact between the glass sheet and said abutments.

12. The process according to claim 10 including the step of accelerating said abutments to a speed greater than that of the glass sheet after the contact between the glass sheet and both of said contacts, but before said step of moving said abutments so as to permit passage of the glass sheet.

13. The positioning process according to claim 9 including the step of detecting the arrival of a glass sheet travelling on the conveyor.

14. The positioning process according to claim 9 wherein the step of detecting the contact of the glass with the abutments comprises detecting the momentum imparted to each abutment by the glass sheet.

* * * * *

UNITED STATES PATENT AND TRADEMARK OFFICE
CERTIFICATE OF CORRECTION

PATENT NO. : 4,979,974

DATED : Dec. 25, 1990

INVENTOR(S) : Denis Mathivat, et al.

It is certified that error appears in the above-identified patent and that said Letters Patent is hereby corrected as shown below:

The title page should be deleted to appear as per attached title page.

The Drawing Sheet, consisting of FIG. 2, should be added as shown on the attached page.

Signed and Sealed this

Fourteenth Day of July, 1992

Attest:

DOUGLAS B. COMER

*Attesting Officer*     *Acting Commissioner of Patents and Trademarks*

United States Patent [19]

Mathivat et al.

[11] Patent Number: 4,979,974
[45] Date of Patent: Dec. 25, 1990

[54] METHOD AND APPARATUS FOR POSITIONING OF A GLASS SHEET TRAVELLING ON A CONVEYOR

[75] Inventors: Denis Mathivat; Jean-Marc Petitcollin, both of Thourotte, France

[73] Assignee: Saint-Gobain Vitrage International, Courbevoie, France

[21] Appl. No.: 494,450

[22] Filed: Mar. 16, 1990

[30] Foreign Application Priority Data

Mar. 24, 1989 [FR] France .................. 89 03936

[51] Int. Cl.⁵ .......................................... C03B 23/023
[52] U.S. Cl. .......................................... 65/29; 65/106; 65/289; 65/291; 65/163
[58] Field of Search ............. 65/29, 163, 106, 289, 65/291

[56] References Cited

U.S. PATENT DOCUMENTS

| | | | |
|---|---|---|---|
| 4,634,329 | 1/1987 | Diederen et al. | 65/106 X |
| 4,666,493 | 5/1987 | Frank et al. | 65/29 |
| 4,753,668 | 6/1988 | Honjo et al. | 65/29 |
| 4,838,920 | 6/1989 | Blasquez-Gonzoles et al. | 65/106 X |

*Primary Examiner*—Robert L. Lindsay
*Attorney, Agent, or Firm*—Oblon, Spivak, McClelland, Maier & Neustadt

[57] ABSTRACT

For positioning a glass sheet moving on a conveyor, two substantially identical assemblies are positioned on opposite lateral sides of the conveyor. Each of the assemblies includes an arm carrying an abutment and extending in proximity to the conveyor such that a glass sheet moving on the conveyor will contact the abutment and be prevented from movement along the conveyor beyond the abutment. Contact between the glass sheet on the conveyor and an abutment will cause the abutment to move slightly, so that such contact can be detected. When the glass sheet contacts both abutments, the arms are driven for permitting passage of the glass sheet.

14 Claims, 2 Drawing Sheet

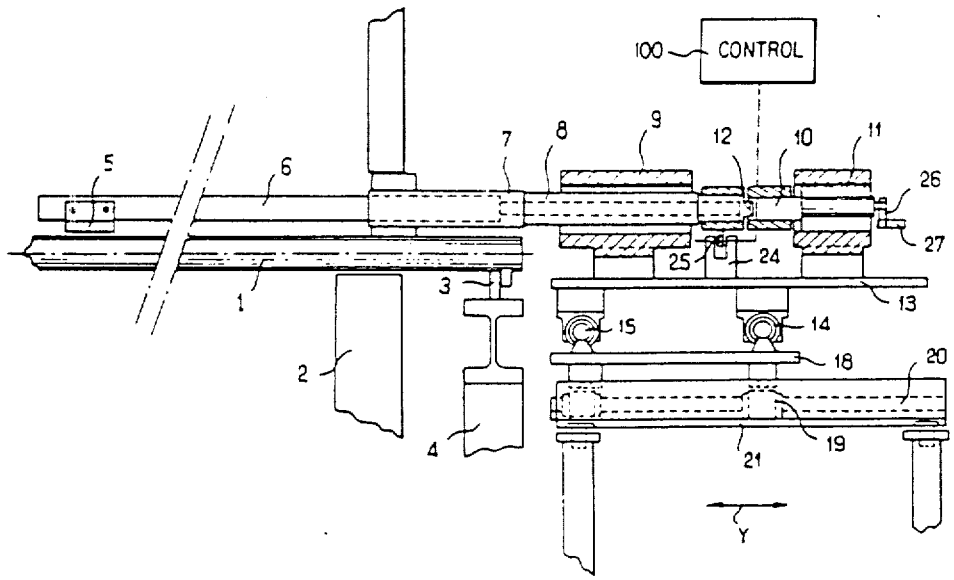

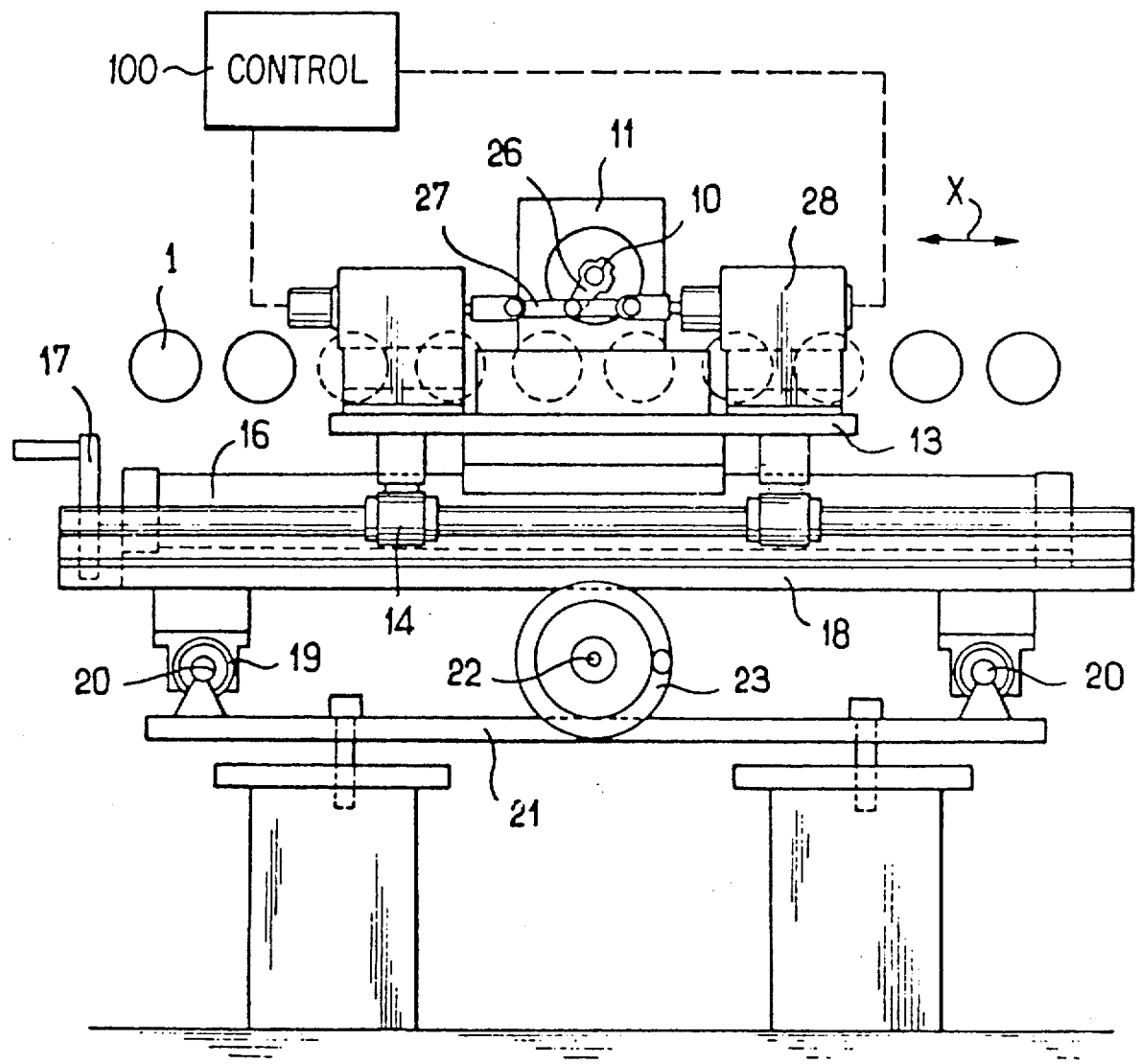
FIG_2